Nov. 22, 1932.                R. E. BROWN                1,888,489
                                KNIFE
                         Filed Jan. 9, 1932
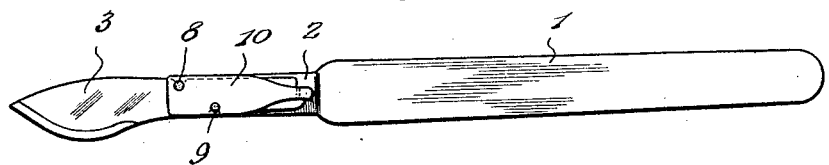
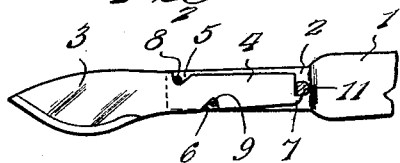
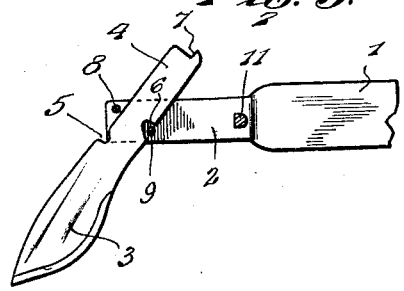
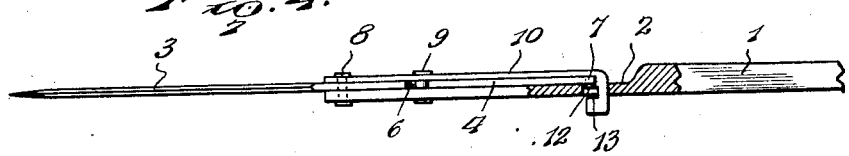
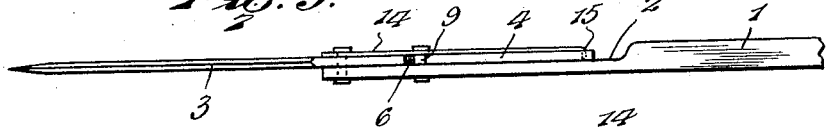
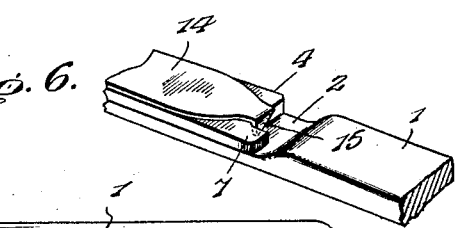
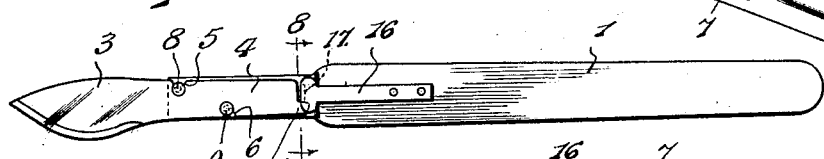
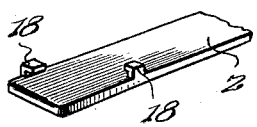
Inventor
R. E. Brown.
By Lacey & Lacey, Attorneys Patented Nov. 22, 1932

1,888,489

UNITED STATES PATENT OFFICE

ROBERT E. BROWN, OF OLEAN, NEW YORK

KNIFE

Application filed January 9, 1932. Serial No. 585,783.

The object of this invention is to provide a knife for use by surgeons in which blades of various forms may be interchangeably used upon one handle. A further object of the invention is to provide means whereby, when a blade is in position upon a handle, it will be effectually locked in place but may be very easily removed to be sharpened or sterilized or permit a different blade to be used. Other objects of the invention will appear incidentally in the course of the following description and the invention resides in certain novel features which will be particularly defined in the appended claims.

In the annexed drawing,

Figure 1 is a plan view of a knife embodying the invention,

Fig. 2 is a detail plan view of the blade-carrying end of the handle with a blade in working position thereon, the latch spring being removed and parts being shown in section, Fig. 3 is a view similar to Fig. 2 but showing the blade in position to be removed.

Fig. 4 is an edge elevation, with parts in section, on a larger scale,

Fig. 5 is an elevation showing a slight modification,

Fig. 6 is a detail perspective view of a part of the device shown in Fig. 5,

Fig. 7 is a plan view showing a further modification,

Fig. 8 is an enlarged detail section on the line 8—8 of Fig. 7,

Fig. 9 is a detail perspective showing a further modification.

In carrying out the invention, there is provided a handle 1 which may be of any preferred form and is illustrated as a flat narrow bar reduced in thickness at one end, as shown at 2, the blade being intended to be mounted upon the reduced end portion of the handle. The blade consists of a cutting portion 3 of any desired outline and a shank 4 extending from the cutting portion in substantial alinement therewith. The shank portion 4 of the blade is provided in its opposite edges with notches 5 and 6 which are spaced apart longitudinally of the blade, as clearly shown in Figs. 2 and 3, and at the inner end of the blade, at that side edge containing the notch 6, the shank is formed with a shoulder or tooth, as shown at 7, to be engaged by a latch whereby the blade will be locked in working position. The reduced end portion 2 of the handle carries studs or rivets 8 and 9 which are adapted to be engaged by the respective notches 5 and 6 of the shank and are headed so as to serve as keepers for the parts carried thereby. A leaf spring 10 is mounted upon these rivets or studs and is held by the heads of the same to extend longitudinally of the handle member, the inner or free end of the spring being reduced in width, as clearly shown in Fig. 1, and terminating in a down-turned lug 11 which is adapted to pass through an opening 12 provided therefor in the handle and be engaged by the tooth 7, as shown in Fig. 2, to lock the blade in working position. The lug 11 is constructed with a notch 13 in that edge presented toward the blade and normally this lug is alined with or below the reduced end portion of the handle, as shown in Fig. 4, the lug projecting through the opening in the handle so that it is accessible from the side thereof opposite the side upon which the blade is mounted. When the blade is in working position, as shown in Figs. 1 and 2, the rivets or studs 8 and 9 and the lug 11 effectually prevent any movement of the blade. When the blade is to be removed, pressure is exerted upon the projecting end of the lug 11 to push the same through the opening 12 and cause the notch 13 to aline with the tooth or shoulder 7 of the blade whereupon the blade may be rocked about the stud 8 until the tooth or shoulder 7 has cleared the lug 11 and the notch 6 has moved out of engagement with the stud 9, as shown in Fig. 3, whereupon the blade may be drawn endwise between the studs or rivets 8 and 9 and withdrawn from the handle. It will be understood that the blade cannot move upwardly away from the handle because the leaf spring or latch 10 is disposed over it and held by the heads of the studs or rivets and the spacing of the studs is such that they effectually resist both endwise and sidewise movement of the shank of the blade until the shank is released from the latch. A reverse operation will, of course, secure another blade in operative relation to the handle.

In Figs. 5 and 6, I have shown a variation in which the blade is of the same construction as that previously described, but the latch spring 14 differs from the latch first described and shown in Figs. 1 to 4 by dispensing with the lug 11 and having its end turned downwardly to form a tooth or lip 15 which will abut the shoulder or tooth 7 of the blade, as shown in Fig. 6, and thereby lock the blade in place. In this form of the invention, the opening 12 through the handle member is unnecessary and the latch may be released from the blade when it is desired to remove the blade by pressing the thumb nail under the free end of the latch, or the latch may be made slightly wider than the blade so that the finger of the operator may be engaged under the latch to lift it from its engagement with the blade.

In Figs. 7 and 8, there is shown a further modification in which the latch is in the form of a leaf spring 16 secured upon the handle member and projecting over the reduced end portion thereof, being provided on its underside, at its free end, with a beveled lug or detent 17 adapted to abut the shoulder or tooth 7 of the blade, as clearly shown in Fig. 8. This latch may be released from the blade by upward pressure exerted under its latching end, as is obvious.

In Fig. 9, I have shown a construction which is somewhat cheaper than the previously described construction in that the rivets or studs 8 and 9 are dispensed with and lugs 18 are formed on the opposite edges of the handle member, these lugs being inverted L-shape in section so that their upper extremities may overlap the edges of the blade and the lugs will engage in the notches 5 and 6 and thereby retain the blade in place in the same manner that the headed rivets or studs perform that function in the arrangement shown in Fig. 7.

In all forms of the invention there is provided a removable blade which may be very easily withdrawn from the handle and just as easily placed in operative relation thereto.

Having thus described the invention, I claim,

1. A knife comprising a handle member, headed studs disposed upon the handle member adjacent an end thereof and spaced apart transversely and longitudinally of the handle, a blade having a shank provided with notches in its opposite side edges adapted to engage the studs on the handle, the width of the shank being less than the distance between the studs whereby if the shank be rocked to a position with its longitudinal axis at right angles to a line connecting the studs the blade may be drawn endwise between the studs, and means for locking the blade upon the handle with the notches in the shank of the blade engaging the studs on the handle.

2. A knife comprising a handle member, headed studs on the handle member adjacent an end thereof and spaced apart both longitudinally and transversely of the handle, a blade having a shank provided in its opposite side edges with notches arranged to engage said studs and provided on its inner end with a shoulder, and a latch carried by the handle and having a downturned portion adapted to engage the shoulder on the end of the shank of the blade whereby to lock the blade in engagement with the studs on the handle.

3. A knife comprising a handle having an opening therethrough near one end, headed studs on the handle adjacent said end and spaced apart both transversely and longitudinally of the handle, a blade having a shank provided in its opposite side edges with notches to engage said studs and having a shoulder at its inner free end, and a resilient latch carried by the handle and having a downwardly extending element to engage across the shoulder on the blade shank whereby the blade will be locked in position upon the handle.

4. A knife comprising a handle, headed studs on one side of the handle adjacent an end thereof, a blade having marginal notches to engage said studs and having a shoulder on its inner end, and a latch secured by the studs over the blade and having its end engaging the shoulder on the inner end of the blade.

5. A knife comprising a handle having a transverse opening therethrough, studs on one side of the handle adjacent an end thereof, a blade having marginal notches to engage the studs and having a shoulder on its inner end, and a latch held by the studs over the blade and having a depending lug at its inner end to engage across the shoulder on the blade and pass through the opening in the handle.

6. A knife comprising a handle having a transverse opening therethrough, studs on one side of the handle adjacent an end thereof, a blade having marginal notches to engage the studs and having a shoulder on its inner end, and a latch held by the studs over the blade and having a depending lug at its inner end to engage across the shoulder on the blade and pass through the opening in the handle, said lug having a notch in one side which is normally below the blade but may be caused to register with the shoulder on the blade upon upward pressure being applied to the lug whereby the blade may be rocked to be released.

7. A knife comprising a handle, headed studs on one side of the handle, a blade having marginal notches to engage the studs and having a shoulder on its inner end, and a resilient latch secured on the handle and having a depending detent at its free end engaging the shoulder on the end of the blade.

In testimony whereof I affix my signature.

ROBERT E. BROWN. [L. S.]